United States Patent [19]

Wrightson et al.

[11] Patent Number: 4,576,505
[45] Date of Patent: Mar. 18, 1986

[54] PULLEY MOUNTING MEANS

[75] Inventors: Robert W. Wrightson; Anthony D. Colliver, both of St. Marys, Australia

[73] Assignee: Coolair Corporation Pte. Ltd., Singapore, Malaysia

[21] Appl. No.: 562,380

[22] Filed: Dec. 16, 1983

[30] Foreign Application Priority Data

Dec. 23, 1982 [AU] Australia ............................. PF7388

[51] Int. Cl.4 ........................... F16D 1/06; F16B 7/10
[52] U.S. Cl. .................................... 403/362; 403/375; 403/377; 403/383; 474/903
[58] Field of Search ............... 474/903, 902; 403/345, 403/365, 362, 375, 377, 383, 360

[56] References Cited

U.S. PATENT DOCUMENTS

| Re. 22,924 | 10/1947 | Mader | 403/383 |
| 2,977,142 | 3/1961 | Alford | 403/345 |
| 3,399,911 | 9/1968 | Reisch | 403/383 |
| 3,679,252 | 7/1972 | Howie, Jr. | 403/383 |
| 3,917,425 | 11/1975 | Allaben, Jr. | 403/371 |
| 4,177,685 | 12/1979 | Delancey | 403/362 |

Primary Examiner—Cornelius J. Husar
Assistant Examiner—Peter M. Cuomo
Attorney, Agent, or Firm—Townsend and Townsend

[57] ABSTRACT

A boss of a pulley is provided with interference lobes which are directed radially inwardly and which, upon assembly, bear against the surfaces of a non-circular shaft and cause consequential deformation of the boss. This ensures a continued pressure between the boss and the shaft which can result in firm retention of the pulley to the shaft, notwithstanding the inherent dimensional instability of polymeric material.

6 Claims, 4 Drawing Figures

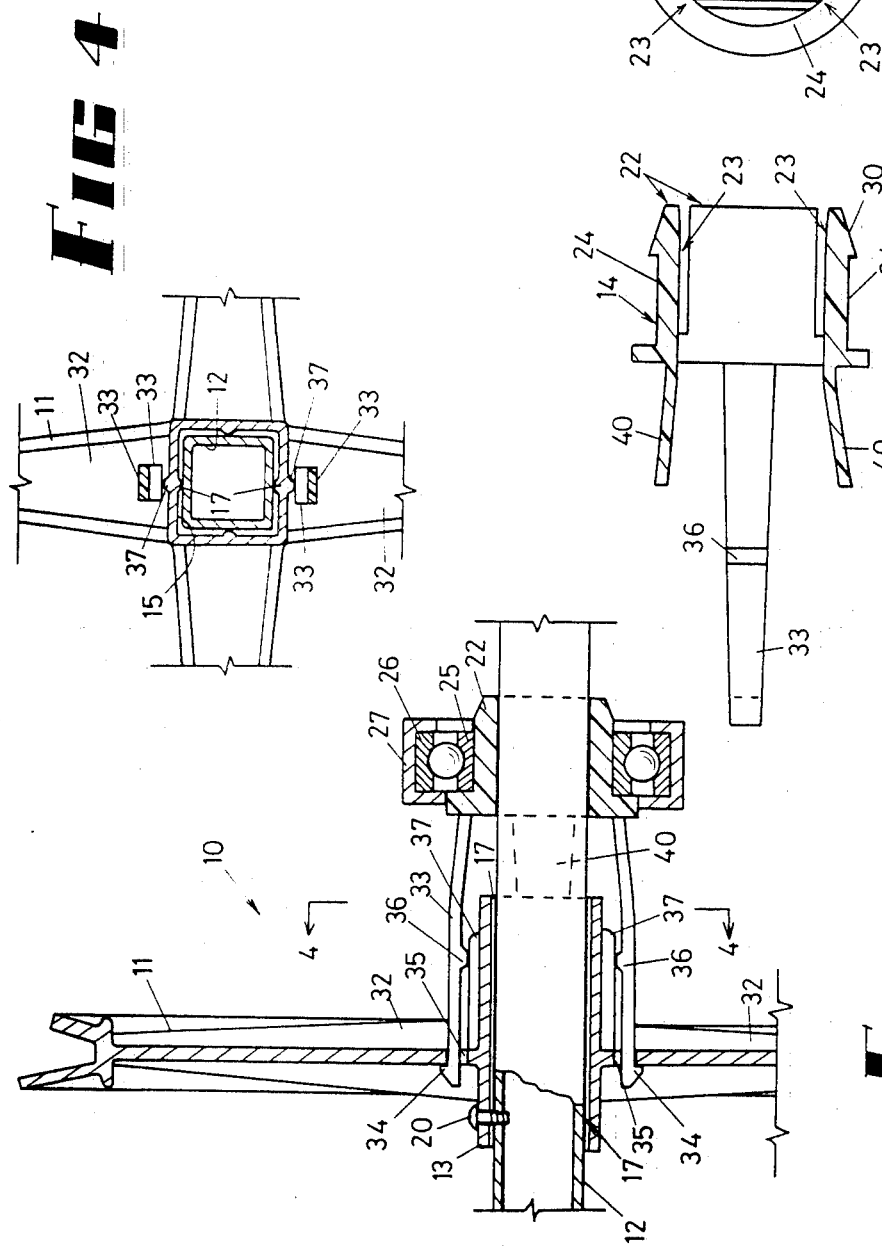

PULLEY MOUNTING MEANS

This invention relates to mounting means for a pulley made from polymeric material.

BACKGROUND OF THE INVENTION

In many applications it is desirable to avoid the use of metal pulleys, for example steel or aluminium, which may corrode and there is a great advantage in using polymeric materials for a pulley, the polymeric material not being liable to corrosion and being lighter in weight than say cast iron. However there are inherent difficulties due to the load strength of the polymeric material available, and the need for a large pulley to transmit high torque onto a relatively small shaft. Still further, polymeric material will creep as time passes, and its shape and size can both vary.

In the event that the polymeric material from which the pulley is made becomes loose on its shaft, it can suffer displacement in an axial direction. Accordingly, it is desirable to anchor a pulley to a shaft, and clearly desirable also that a bearing associated with the shaft should also be constrained against axial displacement.

BRIEF SUMMARY OF THE INVENTION

Briefly, in this invention a boss of a pulley is provided with interference lobes which are directed radially inwardly and which, upon assembly, bear against the surfaces of a non-circular shaft and cause consequential deformation of the boss. This ensures a continued pressure between the boss and the shaft which can result in firm retention of the pulley to the shaft, notwithstanding the inherent dimensional instability of polymeric material.

In the further aspect of this invention, the boss is provided with axially extending tongues separated by slits, the inner surfaces of the tongues defining an aperture complementary to the shape of the non-circular shaft, the inner race of the ball bearing being on the tongue outer surfaces, and being retained against axial displacement by outwardly projecting retaining latches. The tongues may be monolithic with the pulley moulding or may be separate therefrom but constitute an extension of the boss and be joined thereto by latching arms.

With this arrangement, the inner races of the ball bearing can be quickly snapped into position over the tongues, sliding up over the tongue retaining latches but when the shaft is inserted therein the tongues axial displacement is inhibited and the latches cannot then move back inwardly to release the bearing.

BRIEF DESCRIPTION OF THE ACCOMPANYING DRAWINGS

An embodiment of the invention is described hereunder in some detail with reference to and is illustrated in the accompanying drawings in which FIG. 1 is a fragmentary elevational section through a pulley and its mounting means, also showing the mounting of the ball bearing on a square shaft, FIG. 2 is an elevational section which shows a boss extension moulding but rotated 90° from the position shown in FIG. 1, FIG. 3 is an end elevation of FIG. 2, and FIG. 4 is a fragmentary cross-section taken on line 4—4 of FIG. 1.

In this embodiment there is depicted pulley mounting means 10 for mounting to a pulley moulding 11 of polymeric material on a square section shaft 12, wherein the pulley comprises a boss 13, a boss extension moulding 14 comprising boss surfaces 15 and boss extension surfaces 16 which in each case define a square aperture, but the surfaces 15 have radially inwardly directed interference lobes 17 which, then assembled as shown in FIG. 1, bear against the surfaces of square tubular shaft 12 and cause consequential deformation of the square boss 13 as seen best in FIG. 4. The polymeric material of the pulley moulding 11 is necessarily of a resilient nature, and the resilience causes continued inward pressure against the walls of the shaft 12 even upon ageing of the material, this being important to prevent the development of relative movement between the moulding 11 and the shaft 12. Axial displacement is inhibited by a locking fastener 20 which joins pulley 11 to shaft 12.

The boss extension moulding 14 comprises a plurality of tongues 22 which are separated by slits 23, and the inner surfaces of the tongues 22 define between them an aperture of square cross-sectional shape. The outer surfaces 24 of the tongues 22 define between them a cylindrical shape. This supports the inner races 25 of a ball bearing 26 which itself is housed in an annular rubber ring 27 for silencing purposes.

Since the ball bearing 26 is carried on the moulding 14 which is of polymeric material, there is a danger of relative displacement, and if in an axial direction, such displacement could conceivably cause damage to the other elements of the structure. To reduce any such danger, two of the tongues 24 are provided with radially outwardly projecting latches 30, and the ball bearing 36 is positioned over the cylindrical surfaces 24 only by inward deformation of the tongues 22, but upon assembly of the extension moulding 14 on shaft 12 these tongues are inhibited from radial inward movement by the shaft so that the latches 30 inhibit any axial displacement of the ball bearing 26.

The extension moulding 14 is coupled to spokes 32 of the pulley moulding 11 by means of a pair of diametrically opposite latching arms 33 each of which is provided with a respective latch 34 which enters an aperture 35 in a spoke 32, each latching arm 33 being provided with a rib 36 near one end thereof which bears against a projection 37 extending along the boss portion of the pulley moulding 11, and the latches 34 are thereby urged radially outwardly to engage the respective spokes 32, a pressure being applied due to deformation of the latching arms 33.

The invention provides a number of important advantages over prior art:

Firstly, the nature of deformation of the boss 13 is such that it is unlikely for any loose connection to develop between the pulley moulding 11 and the shaft 12.

Even if such a loose connection does develop however the locking fastener 20 retains the pulley moulding 11 against any axial displacement with respect to shaft 12. The latch arms 33 and their latches 34 inhibit any outward movement of these elements towards one another, the abutment wings 40 bearing against one end of the boss 13 of the pulley moulding 11, such that the boss extension moulding 14 is an extension of the boss 13. It ought to be noted however that the extension moulding 14 may be monolithic with respect to boss 13.

Assembly is effected by simply sliding pulley 11 over shaft 12, inserting fastener 20, and then sliding the subassembly of the extension moulding 14 and its bearing 26 over shaft 12 until latches 34 engage respective spokes 32.

We claim:

1. Pulley mounting means for the mounting of a pulley moulding of polymeric material on a shaft with flat surfaces defining a square cross-sectional shape, wherein said pulley comprises a boss, said boss having surfaces defining an aperture also of square cross-sectional shape complementary to the shape of the shaft, said surfaces comprising radially inwardly directed interference lobes which extend in an axial direction and which, upon assembly, bear centrally against respective said flat surfaces of said shaft and cause consequential deformation of the boss, said moulding means further comprising an axially extending moulding, means joining the moulding to the boss, the moulding having tongues separated by slits, the inner surfaces of the tongues defining an aperture of said square cross-sectional shape, the outer surfaces of the tongues defining a cylindrical shape, and a bearing having an inner bearing member carried by said tongue outer surfaces.

2. Pulley mounting means according to claim 1 wherein said tongues are monolithic with said mounting and include outwardly projecting retaining latches on at least two of said tongues which retain said inner bearing member against displacement in one axial direction.

3. Pulley mounting means according to claim 1 wherein said axially extending moulding comprises latching arms, and tongues are separate from said boss but are releasably joined thereto by the latching arms.

4. Pulley mounting means for the mounting of a ball bearing and a pulley of moulded polymeric material on a shaft of square cross-sectional shape, wherein said pulley comprises a boss, a rim, and joining means joining the boss to the rim, said boss having inner surfaces defining an aperture of generally square shape complementary to the shape of the shaft, but having axially extending interference lobes which are radially inwardly directed and which, upon assembly, bear against surfaces of the shaft and cause consequential deformation of the boss, a boss extension moulding comprising a plurality of tongues separated by slits, the inner surfaces of the tongues defining an aperture of said cross-sectional shape, the outer surfaces of the tongues defining a cylindrical shape, and latching arms extending from the extension moulding and engaging said pulley to thereby retain the extension moulding thereto as an extension of said boss, a ball bearing having an inner and outer race, said inner race of said ball bearing being on said tongue outer surfaces, and outwardly projecting retaining latches on two of the tongues retaining said inner race against axial displacement.

5. Pulley mounting means according to claim 4 wherein each said latching arm has a projection intermediate its ends which engages a respective outer surface of said boss and strains that latching arm in such a way that its latch is retained in engagement with said pulley by the resilience of that latching arm.

6. Pulley mounting means according to claim 4 or claim 5 further comprising a rubber ring surrounding said outer race of said ball bearing.

* * * * *